United States Patent [19]
Snow et al.

[11] Patent Number: 6,094,663
[45] Date of Patent: Jul. 25, 2000

[54] METHOD AND APPARATUS FOR IMPLEMENTING ATOMIC QUEUES

[75] Inventors: Kevin D. Snow, Alta; Derrick M. Carty, San Jose, both of Calif.

[73] Assignee: Apple Computer, Inc., Cupertino, Calif.

[21] Appl. No.: 09/052,745

[22] Filed: Mar. 31, 1998

[51] Int. Cl.[7] .................................................. G06F 17/30
[52] U.S. Cl. .......................... 707/201; 707/200; 707/202; 707/203; 707/204
[58] Field of Search .................................. 707/200, 202, 707/203, 204; 701/120; 710/5; 711/163; 342/36; 375/371

[56] References Cited

U.S. PATENT DOCUMENTS

| | | | |
|---|---|---|---|
| 4,584,639 | 4/1986 | Hardy | 713/202 |
| 5,553,305 | 9/1996 | Gregor | 395/826 |
| 5,619,650 | 4/1997 | Bach | 395/200.01 |
| 5,793,978 | 8/1998 | Fowler | 395/200.56 |
| 5,909,540 | 6/1999 | Carter | 395/182.02 |
| 5,915,094 | 6/1999 | Kouloheris | 395/200.49 |
| 5,918,229 | 6/1999 | Davis | 707/10 |
| 5,961,584 | 10/1999 | Wolf | 709/103 |

*Primary Examiner*—Hosain T. Alam
*Assistant Examiner*—Diane D. Mizrahi
*Attorney, Agent, or Firm*—Beyer Weaver & Thomas LLP

[57] ABSTRACT

Methods and apparatus for implementing queues without disabling interrupts or using locks are disclosed. According to one aspect of the present invention, a queue structure, which is accessible to a plurality of threads, that is suitable for use in a computer system includes a head node and a first data-containing node. The head node includes a head field and a disruption field that is arranged to indicate a number of times the queue structure is accessed. The first data-containing node, which is identified by the head field in the head node, includes a link field and a data field. In one embodiment, the head node also includes a rank field, which is arranged to identify a preference level associated with the plurality of threads. In such an embodiment, the head field may be the first field in the head node, the rank field may be the second field in the head node, and the disruption field may be the third field in the head node.

37 Claims, 12 Drawing Sheets

METHOD AND APPARATUS FOR IMPLEMENTING ATOMIC QUEUES

BACKGROUND OF THE INVENTION

1. Field of Invention

The present invention relates generally to the implementation of queues for use in computer systems. More particularly, the present invention relates to the implementation of atomic queues which are multi-thread safe, multi-processor safe, and interrupt safe.

2. Description of the Relevant Art

As the use of networked computer systems increases, the sharing of data by multiple software applications is becoming more prevalent. Data is often organized in lists, e.g., queue structures, which serve to maintain the data in a particular sequence. By organizing data in queues, the tracking of the data is facilitated. In addition, the location of specific pieces of data may be readily located by different software applications when the data is organized in a queue. The type of data maintained in a queue may generally be widely varied. For example, a queue may contain, but is not limited to, such data as disk request data and networking data.

FIG. 1 is a diagrammatic representation of a conventional queue structure. A queue 104 is a linked list of elements 108, or nodes, which contain data 112. Although queue 104 may either be static or dynamic, e.g., constantly changing, queue 104 is typically dynamic. Each node 108 also includes a link field 114 which contains link information pertaining to the sequence of nodes 108 in queue 104. By way of example, link field 114a of node 108a may contain link information, e.g., a pointer, which identifies node 108b, which immediately follows node 108a. In other words, link fields 114 are typically pointers to subsequent nodes 108 which are located in predefined positions in computer memory space.

Data 112 in each node 108 generally represents a logical grouping of data. That is, data 112 in a particular node 108, e.g., data 112a in node 108a, relates to a related group of information. For example, data 112a may include character strings which relate to disk request information. In general, all data 112 in queue 104 may include related information, although it should be appreciated that data 112 in queue 104 may include a variety of information that is not necessarily related.

Queue 104 includes a head 118, which is the start of queue 104. That is, head 118 is element of queue 104 which identifies the beginning of queue 104. In general, head 118 includes only a head value 122, which is a global variable that points to the first data-containing node 108 in queue 104, e.g., node 108a. As will be appreciated by those skilled in the art, head 118 does not include data.

Queues typically have no length restrictions, and may include any number of nodes. The ordering of the nodes within a queue allows data contained in the nodes to be maintained in a particular sequence. Such a sequence may be a chronological sequence. Alternatively, such a sequence may be based upon an order that facilitates the execution of a software application.

Methods used to implement queues such as atomic queues are generally widely varied. Some methods are suitable only if one process, or one thread, is arranged to use a particular queue. In other words, some methods are applicable only if a queue is effectively a "private" data structure which is used only by one thread. One method that is used when a queue may only be accessed by a single thread involves the manipulation of pointers. Other methods used to implement queues are suitable for use in multi-threaded and multiprocessor systems. Such methods include methods which disable interrupts, and methods which utilize semaphores.

A method which implements a queue by disabling interrupts allows the queue to be multi-thread safe by ensuring that only a single thread may have access to the thread at any given time. Interrupts effectively inhibit a processor from completing a task by allowing a particular process, e.g., network traffic, which requires immediate processing to interrupt the current task and execute. When interrupts are disabled, substantially only the thread, e.g., the current thread, which takes "possession" of the queue is allowed to operate on the queue, while other threads wait for the current thread to complete operations. Typically, time-critical processes, e.g., disk input/output and network traffic, are allowed to execute during interrupts. However, when interrupts are disabled, such processes are effectively halted while a thread is operating on a queue, which may cause the overall computer system to operate in a less efficient manner. In other words, a performance penalty may be accessed when interrupts are disabled. Further, disabling interrupts in some operating systems often proves to be difficult.

In an operating system which does not readily enable interrupts to be disabled, one method for implementing queues involves implementing flags, e.g., semaphores. As will be appreciated by those skilled in the art, a semaphore is effectively a lock, such as a lock that may be associated with a queue, which allows only the thread which possesses the lock to operate on the queue at any given time. That is, before a thread is allowed to manipulate a queue, the thread must acquire the semaphore associated with the queue. Until the thread releases the semaphore, the thread has exclusive access to the queue. As a result, the use of a semaphore allows an associated queue to be multithread safe.

Although a queue which is associated with a semaphore is multi-thread safe and multiprocessor safe, such a queue may not be used during an interrupt. If a queue which has a semaphore is used during an interrupt, the semaphore may not be released until the interrupt is complete. At the same time, the interrupt may not be completed until the semaphore is released. As such, a computer system which allows a queue with a semaphore to be used during an interrupt may be deadlocked such that the computer system is effectively hung.

For some systems, e.g., a UNIX system or a Windows NT system, since only a kernel operates at an interrupt level, the use of queues which have associated semaphores is less likely to cause the system to be deadlocked. However, for systems which offer system services such as disk input/output via interrupts, queues with associated semaphore generally may not be used.

Therefore, what is needed is a method and an apparatus for implementing queues without disabling interrupts or using semaphores. That is, what is desired is an efficient method for implementing atomic queues that are multi-thread safe, multiprocessor safe, and interrupt safe.

SUMMARY OF THE INVENTION

The present invention relates to methods and apparatus for implementing queues without disabling interrupts or using locks. According to one aspect of the present invention, a queue structure, which is accessible to a plurality of threads, that is suitable for use in a computer system includes a head node and a first data-containing node. The head node includes a head field and a disruption field that is arranged to indicate a number of times the queue structure is accessed. The first data-containing node, which is identified by the head field in the head node, includes a link field and a data field. In one embodiment, the head node also includes a rank field, which is arranged to identify a preference level associated with the plurality of threads. In such an embodiment, the head field may be the first field in the head node, the rank field may be the second field in the head node, and the disruption field may be the third field in the head node.

In another aspect of the present invention, a method for enqueuing an additional node, which includes a link field, to a head of a queue, which also includes at least one node, includes acquiring the disruption level of the queue, reading the contents from the head field into the link field of the additional node, determining whether the queue has been disrupted, and, when the determination is that the queue has not been disrupted, storing an address of the additional node into the head field. In one embodiment, the head includes a rank field arranged to contain a rank of the queue. In such an embodiment, the method also includes acquiring the rank of the queue. In another embodiment, acquiring the disruption level of the queue includes reading the disruption level of the queue from the disruption field in the head into a first variable, incrementing the first variable, and storing the first variable in the disruption field in the head.

According to still another aspect of the present invention, a method for enqueuing an additional node on a queue includes acquiring the disruption level of the queue. Using the disruption level, a determination is made regarding whether the queue has been disrupted since the disruption level was acquired. If it is determined that the queue has not been disrupted, then an address of the additional node is stored into a link field of at least one node associated with the queue. In one embodiment, the head also includes a rank field that contains the rank of the queue. In another embodiment, the method further includes setting the link field of the additional node to indicate that the additional node is a tail of the queue.

In accordance with yet another aspect of the present invention, a computer-implemented method for dequeuing a first node from a queue that has a head, the first node, and a second node such that the second node immediately precedes the first node, includes acquiring the disruption level of the queue, determining whether the queue has been disrupted, and when the queue has not been disrupted, storing contents of the link field of the first node into a link field of the second node when it is determined that the queue has not been disrupted. In one embodiment, when the method is implemented on a multi-processor computer system, the head may further include a rank field arranged to contain a rank of the queue. In such an embodiment, the method includes reading the rank of the queue from the rank field of the head, incrementing the rank of the queue, and storing the rank of the queue in the rank field of the head.

These and other advantages of the present invention will become apparent upon reading the following detailed descriptions and studying the various figures of the drawings.

BRIEF DESCRIPTION OF THE DRAWINGS

The present invention may best be understood by reference to the following description taken in conjunction with the accompanying drawings in which.

DETAILED DESCRIPTION OF THE EMBODIMENTS

In order to enable a queue to be used by more than one application, e.g., in order to allow a queue to be multi-thread safe and multiprocessor safe, interrupts in a computer system are often blocked. By disabling interrupts and, hence, preventing system services which operate during interrupts from operating while a queue is manipulated, e.g., updated, the overall system is effectively ensured that only a single thread may manipulate the queue at any given time. As such, the systems is multi-thread safe. However, disabling interrupts may lead to significant performance penalties.

In lieu of blocking interrupts, a semaphore may be used on a queue to ensure that only the thread which possesses the semaphore is allowed to operate on the queue at any given time. Although the use of semaphores is effective to allow a queue to be multi-thread safe, the queue generally may not be used during interrupts, in order to avoid the occurrence of a deadlock computer system.

In one embodiment of the present invention, in order to allow a queue to be multi-thread safe and multiprocessor safe, without disabling interrupts or using semaphores, a rank and a disruption level may be added to the head of the queue. A rank is arranged to identify whether a particular thread has priority for completing an operation on the queue, or whether another thread has priority. A disruption level is arranged to indicate to a thread whether the queue has been disrupted since the thread began manipulating the queue. That is, the disruption level indicates whether the queue has been changed. When the disruption level indicates that a queue has been changed, then a thread which has previously begun manipulating the queue restarts manipulation of the queue. As such, each thread which attempts to gain access to a queue may first poll the head of the queue to obtain the rank and the disruption level, then continue periodically polling the head once access to the queue is gained, in order to monitor the status of the queue. By way of example, each time a thread accesses a node in the queue, the disruption level is typically checked to determine whether the queue has been disrupted. If the queue has been disrupted, then the thread returns to the first node of the queue and effectively recommences operations on the queue.

Figure 1:
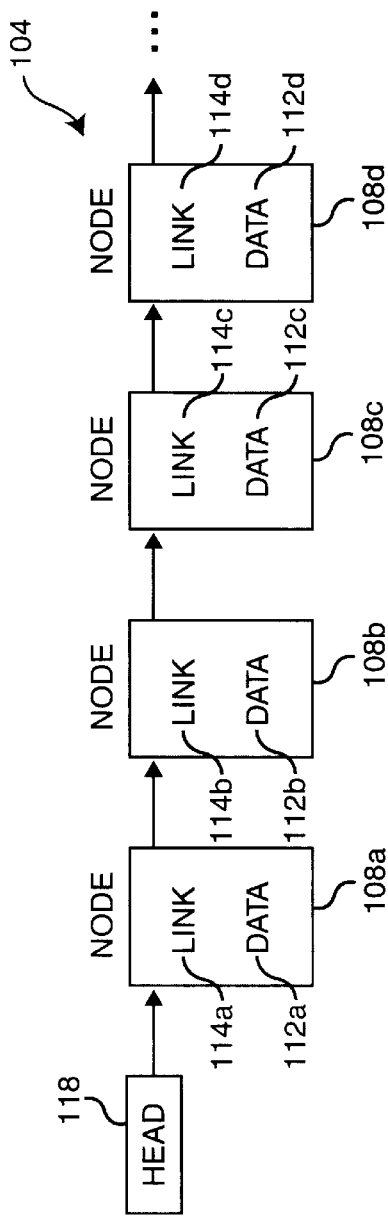
FIG. 1 is a diagrammatic representation of a conventional queue structure.
Figure 2A:
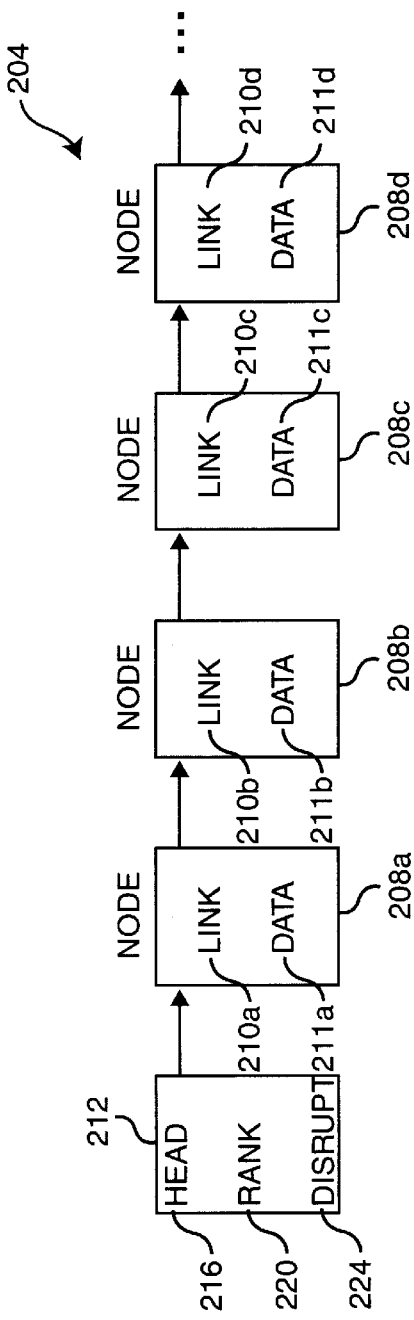
FIG. 2a is a diagrammatic representation of a queue structure in accordance with an embodiment of the present invention.

FIG. 2a is a diagrammatic representation of a queue structure in accordance with an embodiment of the present invention. A queue 204 includes nodes 208, or elements, which form a linked list. By way of example, node 208a has a link field 210a which contains a link to the next node, namely node 208b, in queue 204. Nodes 208, in addition to including link fields 210, also include data 211. As such, nodes 208 are essentially data-containing nodes. A first element in queue 204, referred to herein as head node 212, is effectively the beginning of queue 204. Head node 212 includes a head 216, a rank 220, and a disruption level 224. Head 216 is effectively a global variable that points to nodes 208 or, more specifically, node 208a. Typically, rank 220 and disruption level 224 are words, e.g., rank 220 and disruption level 224 may be 32-bit words.

Rank 220 is arranged to give preference to certain threads or, in some embodiments, certain processes, which may access queue 204. Typically, the thread with the highest rank is allowed to complete operations on queue 204, while lower-ranked threads are not allowed to complete operations while the thread with the highest rank is performing operations. By giving preferences to certain threads, a situation is prevented in which a plurality of threads are attempting to utilize queue 204, and no thread is allowed to complete its task with respect to queue 204. In the described embodiment, rank 220 is arranged to assign thread preferences in a last-in-first-out (LIFO) order. A LIFO order is generally used to allow a thread, such as an interrupt, to "have" queue 204 at substantially any given time, while effectively preventing lower level threads from completing tasks with respect to queue 204. In other words, the interrupt is allowed to complete its operation with respect to queue 204, after which time lower level threads may re-start previously started tasks from the beginning. In general, although rank 220 may be used in substantially any system, rank 220 is often included only in multi-threaded systems. The use of rank 220 in a system in which only a single thread may access queue 204 at any given time is essentially unnecessary.

Disruption level 224 is arranged to indicate whether queue 204 has been changed, e.g., whether any node 208 has been enqueued or dequeued from queue 204, as mentioned above. That is, disruption level 224 is arranged to indicate to a particular thread whether queue 204 has potentially been altered since the last time the particular thread checked disruption level 224. By way of example, each time a thread "enters" queue 204, disruption level 224 may be modified. In one embodiment, disruption level 204 may be a counter. As such, each time a thread enters queue 204, disruption level 224 may be incremented accordingly, e.g., incremented by one. Therefore, when a thread checks disruption level 224 and finds disruption level 224 to have a different, e.g., higher, value than when the thread first checked disruption level 224, then thread typically will restart its task from the beginning.

Figure 2B:
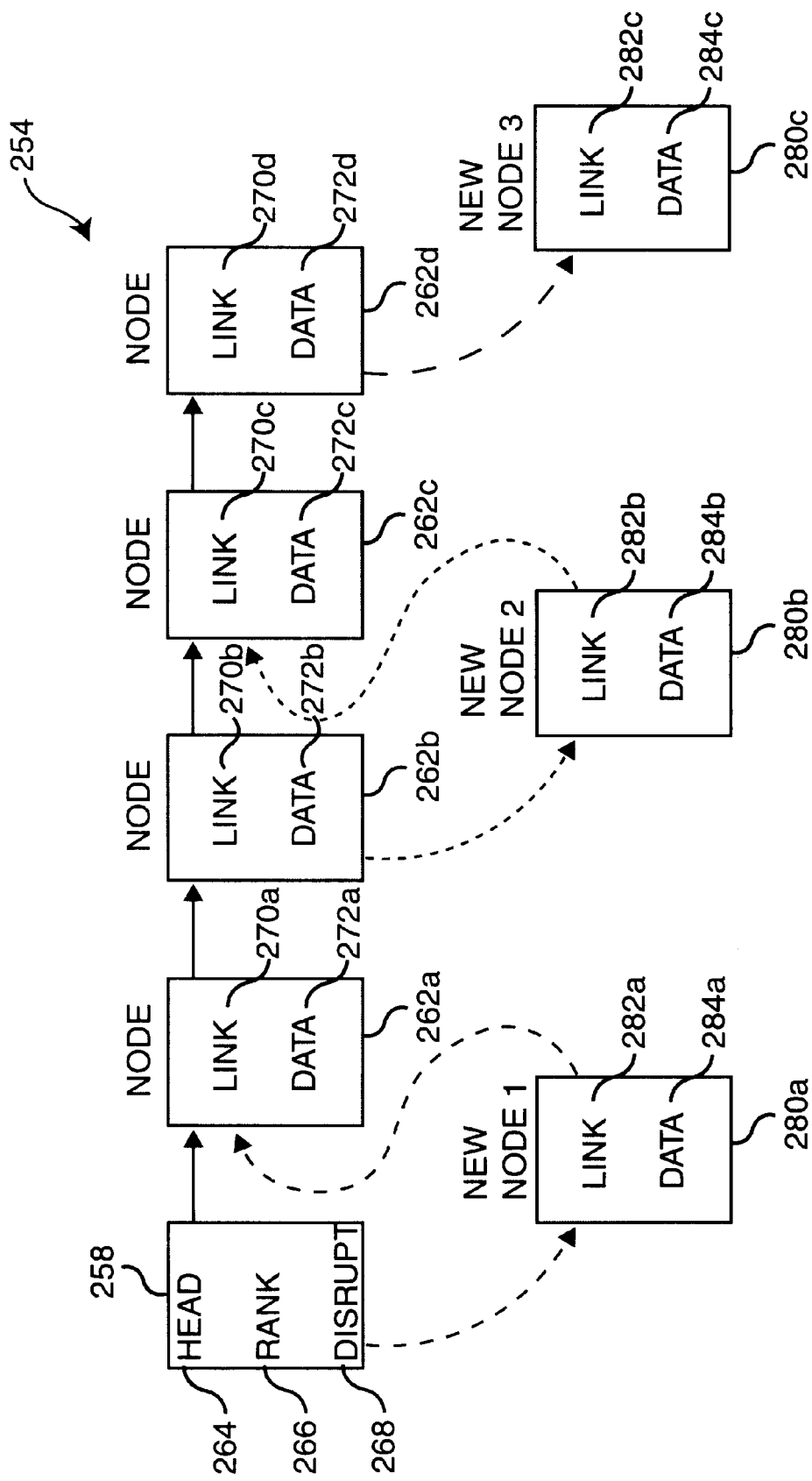
FIG. 2b is a diagrammatic representation of a queue structure shown with new nodes in accordance with an embodiment of the present invention.

In general, a thread may access queues in order to read data, which is contained in nodes of the queues. A thread may also access a queue in order to add or remove nodes from the queue. Referring next to FIG. 2b, a queue structure in accordance with an embodiment of the present invention is shown with new nodes which may be inserted, or enqueued, into the queue structure. A queue 254 includes a head node 258 and four data-containing nodes 262. Head node 258 includes a head 264, which references first data-containing node 262a, a rank 266, and a disruption level 268. Data-containing nodes 262 include link fields 270, which contain links that identify the subsequent data-containing node 262 in queue 254, and data 272. Typically, links contained in link fields 270 are pointers.

New nodes 280, i.e., new data-containing nodes, which include link fields 282 and data fields 284, may be inserted into queue 254. In general, new nodes 280 may be inserted either at the beginning of queue 254, in the middle of queue 254, or at the tail of queue 254. When a new node 280a is inserted at the beginning of queue 254, i.e., immediately after head node 258, the head 264 of head node 258 is effectively be set to identify new node 280a, and link 282a of new node 280a is set to identify data-containing node 262a, as will be described below with reference to FIG. 3. When a new node 280b is to be inserted somewhere in the middle of queue 254, as for example between data-containing node 262b and data-containing node 262c, link 270b of data-containing node 262b is set to identify new node 280b, and link 282b of new node 280b is set to identify data-containing node 262c. The steps associated with inserting a node in the middle of a queue will be described below with respect to FIG. 4. Finally, when a new node 280c is to be added to the tail, or end, of queue 254, link 270d of data-containing node 262d is set to identify new node 290c, and link 282c of new node 280c is set to null, as will be discussed below with reference to FIG. 5.

When a new node, e.g., new node 280a, is created, it should be appreciated that link field 282a is typically initialized to some value. While link field 282a may generally be initialized to substantially any value, as for example a nil value, in the describe embodiment, link field 282a is initialized to identify node 280a. In other words, link field 282a is initially set to point to node 280a.

Figure 3:
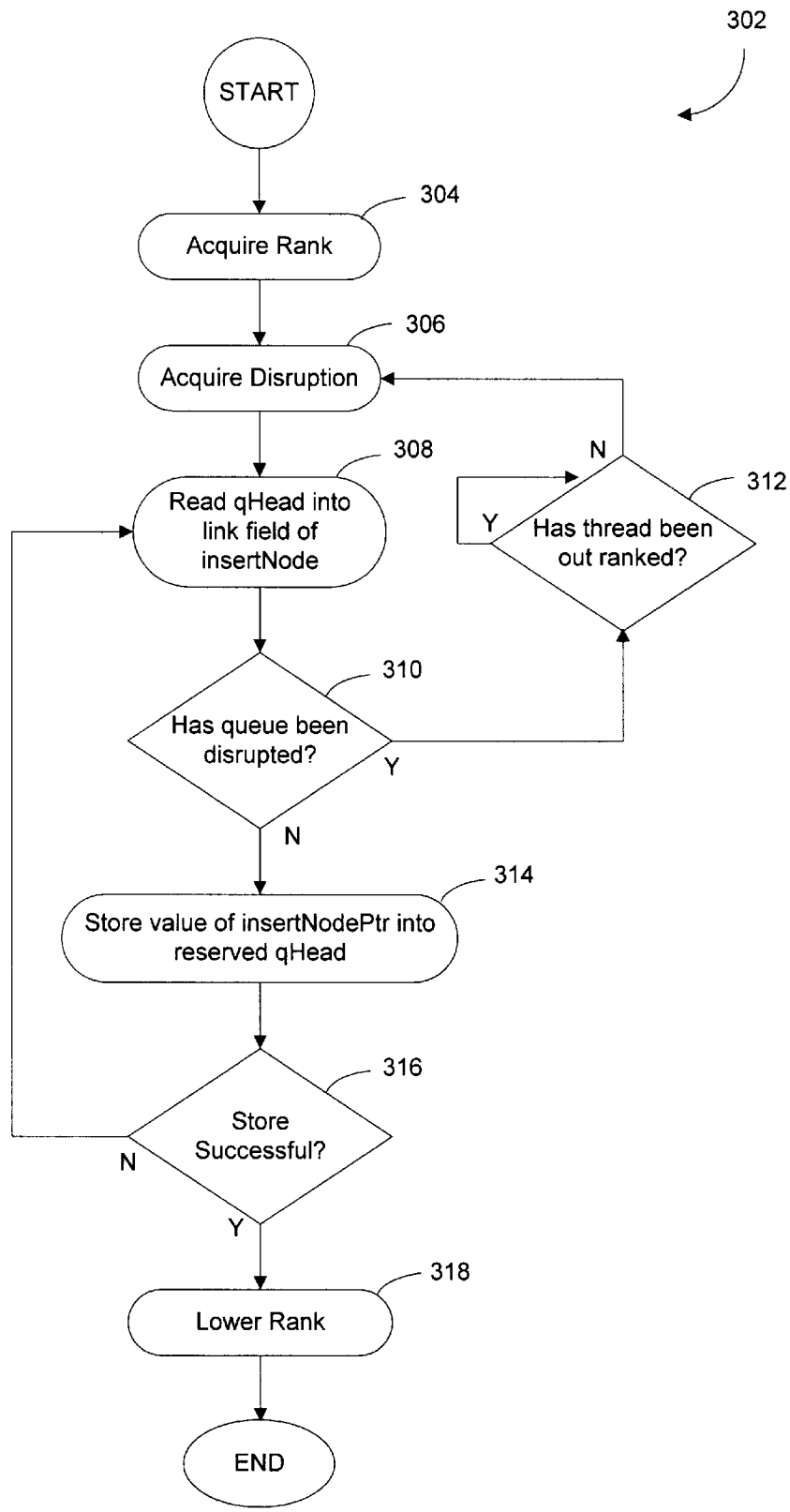
FIG. 3 is a process flow diagram which illustrates the steps associated with enqueuing an element on a head of a queue in accordance with an embodiment of the present invention.
Figure 9:
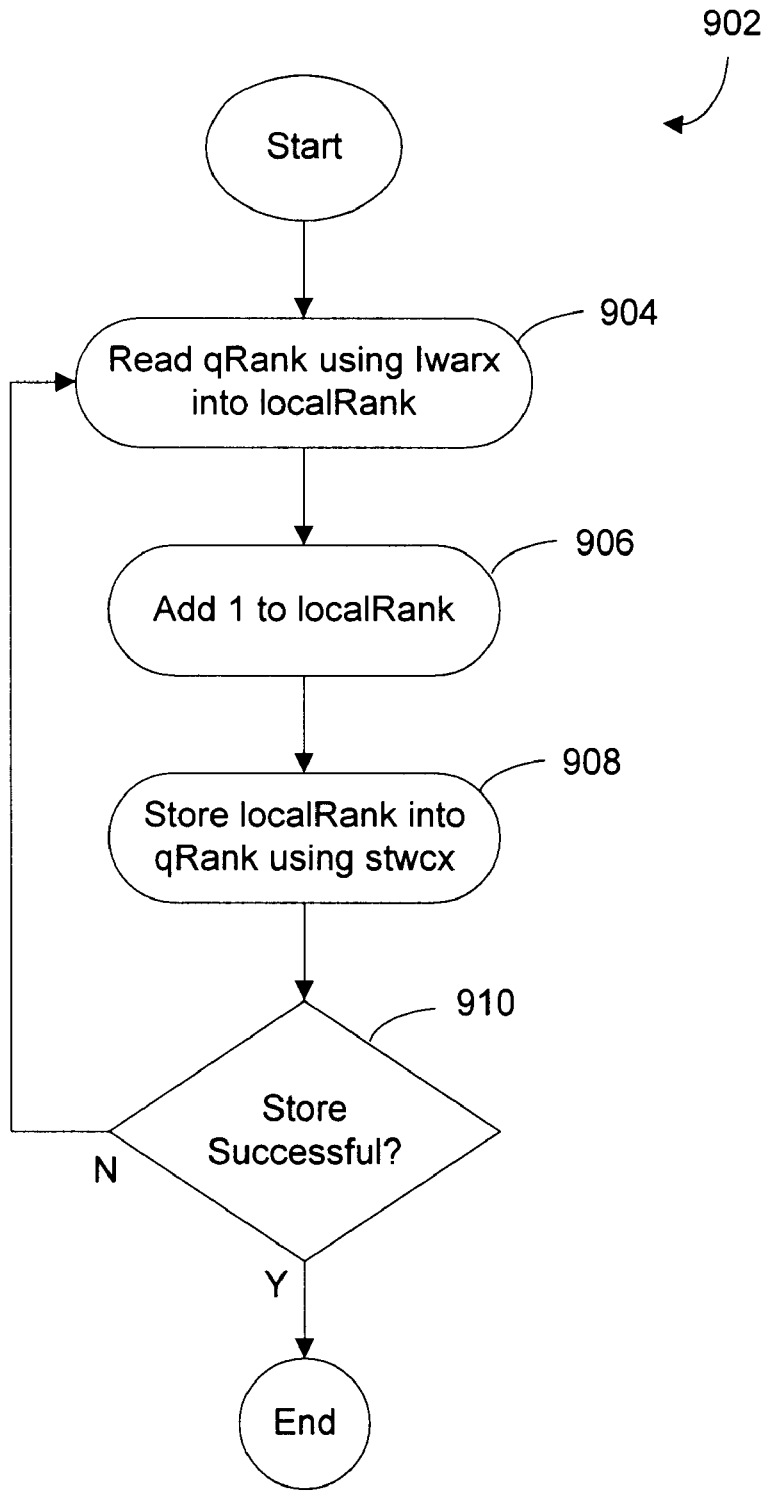
FIG. 9 is a process flow diagram which illustrates the steps associated with atomically acquiring a rank from a queue in accordance with an embodiment of the present invention.

A queue is generally an ordered, linked list of elements, or nodes. Accordingly, lists of data associated with a queue are typically maintained in a particular sequence. When a node is to be inserted at the beginning of a queue, the node is effectively enqueued into the queue after the head node, but in front of the first data-containing node. With reference to FIG. 3, a process of enqueuing a node immediately after the head node, or head, of a queue will be described in accordance with an embodiment of the present invention. A process 302 of adding a node to a queue ahead of the current first node in the queue begins at step 304 in which the rank of the queue is obtained by the thread, or process, which is attempting to add the node to the queue. In general, the thread that is attempting to add a node to a queue is referred to as the enqueuing, or current, thread. As mentioned above, the rank is generally stored as a word in the head of the queue. The thread obtains the rank and typically stores the rank on a stack associated with the thread. One method of acquiring a rank will be discussed below with reference to FIG. 9.

After the rank is acquired by the thread in step 304, the thread acquires a disruption level from the head of the queue in step 306. In the described embodiment, the disruption level is arranged to indicate to the thread whether the queue has been accessed, as described above. The steps associated with one method for acquiring a disruption level and storing the disruption level on a stack will be described below with respect to FIG. 11.

From step 306, process flow proceeds to step 308 where the head value of the queue head, e.g., the "qhead," is read into the link field of the node that is to be inserted, e.g., the "insertNode." In one embodiment, the head value of the queue head is read into the link field of the node to be inserted using a load and reserve, or "lwarx," instruction. An instruction such as an lwarx instruction enables the space associated with the head value of the queue head is effectively reserved.

An lwarx instruction is arranged to mark a particular memory location as reserved by reading a value from memory and reserving the address associated with the value. In the described embodiment, the memory location associated with the head value of the queue head is reserved. A reservation is canceled if a write operation to the reserved address occurs, or if another reservation is made anywhere within the overall system. Effectively, substantially only one reservation is valid per processor at any given time. Hence, a reservation is generally canceled when another memory location is reserved by the same processor associated with the original reservation.

Once the head value of the queue head is read into the link field of the node to be inserted, then in step 310, a determination is made as to whether the queue has been disrupted. In other words, a determination is made regarding whether another thread or process has accessed the queue in the time since the enqueuing thread accessed the queue. Such a determination may be made by comparing the disruption level acquired in step 306 to the current disruption level in the head of the queue.

When it is determined that the queue has not been disrupted, then the implication is that the enqueuing thread is the only thread which is currently attempting to access the queue. In the described embodiment, when the queue has not been disrupted, the disruption level acquired in step 306 will be the same as the current disruption level. Hence, process flow proceeds to step 314 in which an attempt is made to store the value of the pointer to the node that is to be inserted, e.g., the "insertNodePtr," into the reserved head value of the queue head. In other words, an attempt is made to write the pointer to the new node into the head value of the queue head.

After the attempt to conditionally store the value of the pointer to the new node into the reserved head value of the queue head, a determination is made in step 316 regarding whether the storage operation was successful. In one embodiment, an instruction which is arranged to write only to an address when a thread has a reservation on the address may be used. Such an instruction, which may be a "store conditional" instruction, may generally be used to store a value to a previously reserved location, e.g., a location reserved using an lwarx instruction, if effectively no other loads or stores, including reserved loads or stores, have been attempted. If no other loads or stores have been attempted, then the store conditional instruction will typically succeed. In the event that other loads or stores have been attempted, then the store conditional instruction will typically fail.

If the determination in step 316 is that the store operation was successful, then the implication is that the queue was not accessed during the store operation. Accordingly, process flow moves to step 318 where the rank of the queue is lowered. As will be described below with reference to FIG. 9, when the enqueuing thread acquires the rank, e.g., in step 304, the rank of the queue is raised. Hence, lowering the rank in step 318 effectively resets the rank of the queue to the rank level that was present prior to the enqueuing process. The steps associated with lowering the rank will be described in more detail below with respect to FIG. 10. Once the rank is lowered, the process of enqueuing on the head of a queue is completed.

Alternatively, if the determination in step 316 is that the storage operation was not successful, then the indication is that the queue was disrupted during the storage operation. As such, process flow returns to step 308 in which the head value of the queue head is read into the link field of the new node. In other words, since the value in the link field of the new node may no longer be valid, the head value of the queue head is effectively re-read into the link field of the new node. As will be appreciated by those skilled in the art, the value in the link field of the new node may no longer be valid in the event that a different new node has been enqueued on the head of the queue.

Returning to step 310, if the determination is that the queue has been disrupted, then the implication is that the enqueuing thread is not allowed to add the new node to the queue. Specifically, if the queue has been disrupted, it is possible that the queue head read into the link field of the new node is invalid, i.e., identifies an incorrect node. Accordingly, when the determination is that the queue has been disrupted, process flow moves to step 312 where it is determined if the enqueuing thread has been out ranked In one embodiment, such a determination may be made by comparing the rank acquired in step 304 with the current rank of the queue.

If it is determined that the enqueuing thread has not been out ranked, i.e., that the enqueuing thread is the highest ranked thread, then in step 306, the disruption level is acquired from the head of the queue. Alternatively, when the determination in step 312 is that the enqueuing thread is out ranked, then process flow remains at step 312 and repeatedly checks to determine if the enqueuing thread is still out ranked. As described above with respect to FIG. 2b, when the enqueuing thread is out ranked, the enqueuing thread is essentially not allowed to perform any operations on the queue, since only the thread with the highest rank is allowed to perform operations. Instead, the enqueuing thread effectively "spins," or continually determines whether it is out ranked, until the determination in step 312 is that the enqueuing thread is no longer out ranked. When the determination is that the enqueuing thread is no longer out ranked, then process flow moves to step 306 in which the disruption level of the queue is acquired.

Figure 4:
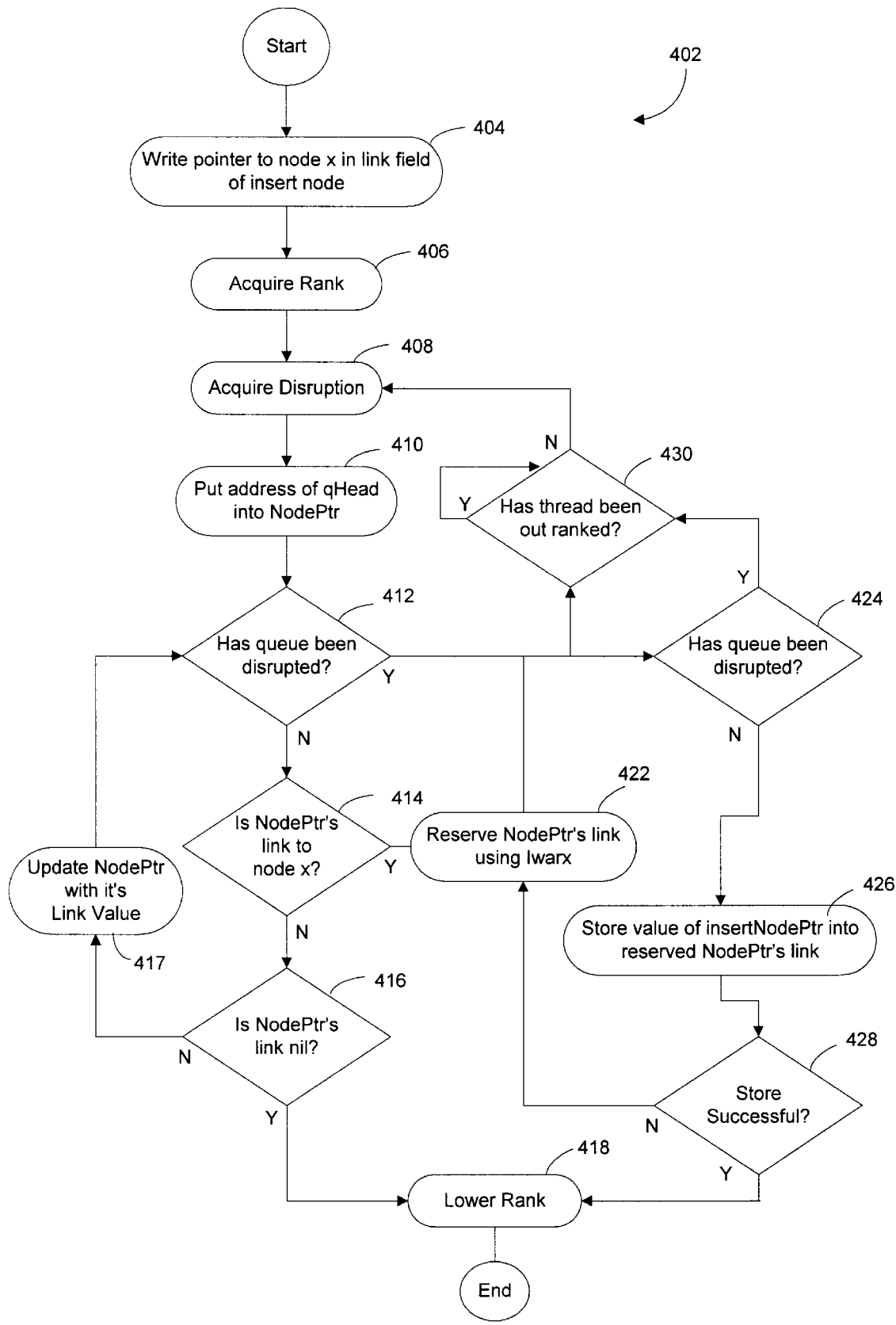
FIG. 4 is a process flow diagram which illustrates the steps associated with enqueuing an element on the middle of a queue in accordance with an embodiment of the present invention.

FIG. 4 is a process flow diagram which illustrates the steps associated with enqueuing a node on the middle of a queue in accordance with an embodiment of the present invention. A process 402 of enqueuing a new node before a node "x" begins at step 404 in which a pointer to node x is written into the link field of the new, or "insert," node. That is, the link field of the new node is set to point to node x.

The enqueuing thread acquires the rank of the queue in step 406, and the disruption level of the queue in step 408. The steps associated with acquiring the rank and the disruption level will be described below with reference to FIGS. 9 and 11, respectively. Once the rank and the disruption level are acquired and stored on a stack, process flow moves to step 410 where the address of head of the queue is placed into the node pointer.

After the address of the head of the queue is placed into the node pointer, then a determination is made in step 412 regarding whether the queue has been disrupted, i.e., since the disruption level was acquired in step 408. In one embodiment, a determination of whether the queue has been disrupted involves comparing the disruption level acquired in step 408 with the current disruption level. If the determination is that the queue has not been disrupted, then process flow proceeds to step 414 where a determination is made regarding whether the node pointer identifies node x. That is, it is determined whether the link field of the node pointer, e.g., the link field of the node that may perched the node to be inserted, identifies node x.

If the determination in step 414 is that the link field of the node pointer identifies node x, then in step 422, the link field of the node pointer is reserved. As previously described, the link field may be reserved using an instruction such as an lwarx instruction. Then, in step 422, the link field of the node pointer is reserved, as for example using an lwarx instruction. Once the reservation is made on the node pointer, a determination is made in step 424 regarding whether the queue has been disrupted. If it is determined that the queue has not been disrupted, an attempt is made to store the value, e.g., the address, of the node to be inserted, namely the "inserLNodePtr," into the reserved link field of the node pointer in step 426.

In step 428, a determination is made regarding whether the storage attempt in step 426 was successful. If the storage attempt was successful, then process flow moves to step 418 where the rank of the queue is lowered, and the process of enqueuing a node in the middle of a queue is completed. Alternatively, when the determination is that the storage attempt was not successful, another attempt to reserve the link field of the node pointer is made in step 422.

Returning to step 424, when the determination is that the queue has been disrupted, a determination is made in step 430 as to whether the enqueuing thread has been outranked. The enqueuing thread is not allowed to resume attempting to insert a node into the queue until it is determined that the enqueuing thread is not outranked. When the enqueuing thread is not outranked, then process flow returns to step 408 in which the current disruption level of the queue is obtained.

If the determination in step 414 is that the node pointer does not identify node x, then process flow moves to step 416 where a determination is made if the node pointer is nil. If it is determined that the link of the node pointer is nil, then the indication is that the node pointer does not identify another node. That is, the indication is that the node pointer is effectively in the last element of the queue. Accordingly, process flow moves to step 418 in which the rank of the queue is lowered. The steps associated with lowering the rank of the queue will be described below with reference to FIG. 11.

Alternatively, if the determination in step 416 is that the link of the node pointer is not nil, then in step 417, the node pointer is updated with its link value. Once the node pointer is updated with its link value, then process flow proceeds to step 412 where a determination is made as to whether the queue has been disrupted.

Returning next to step 412, when it is determined that the queue has been disrupted since the disruption level was last acquired and stored by the enqueuing thread, then process flow moves to step 430 where it is determined whether the enqueuing thread has been outranked. In other words, when the queue has been disrupted, the enqueuing thread is effectively prevented from adding a node to the queue until the enqueuing thread is the highest ranked thread which is attempting to perform an operation on the queue.

Figure 5:
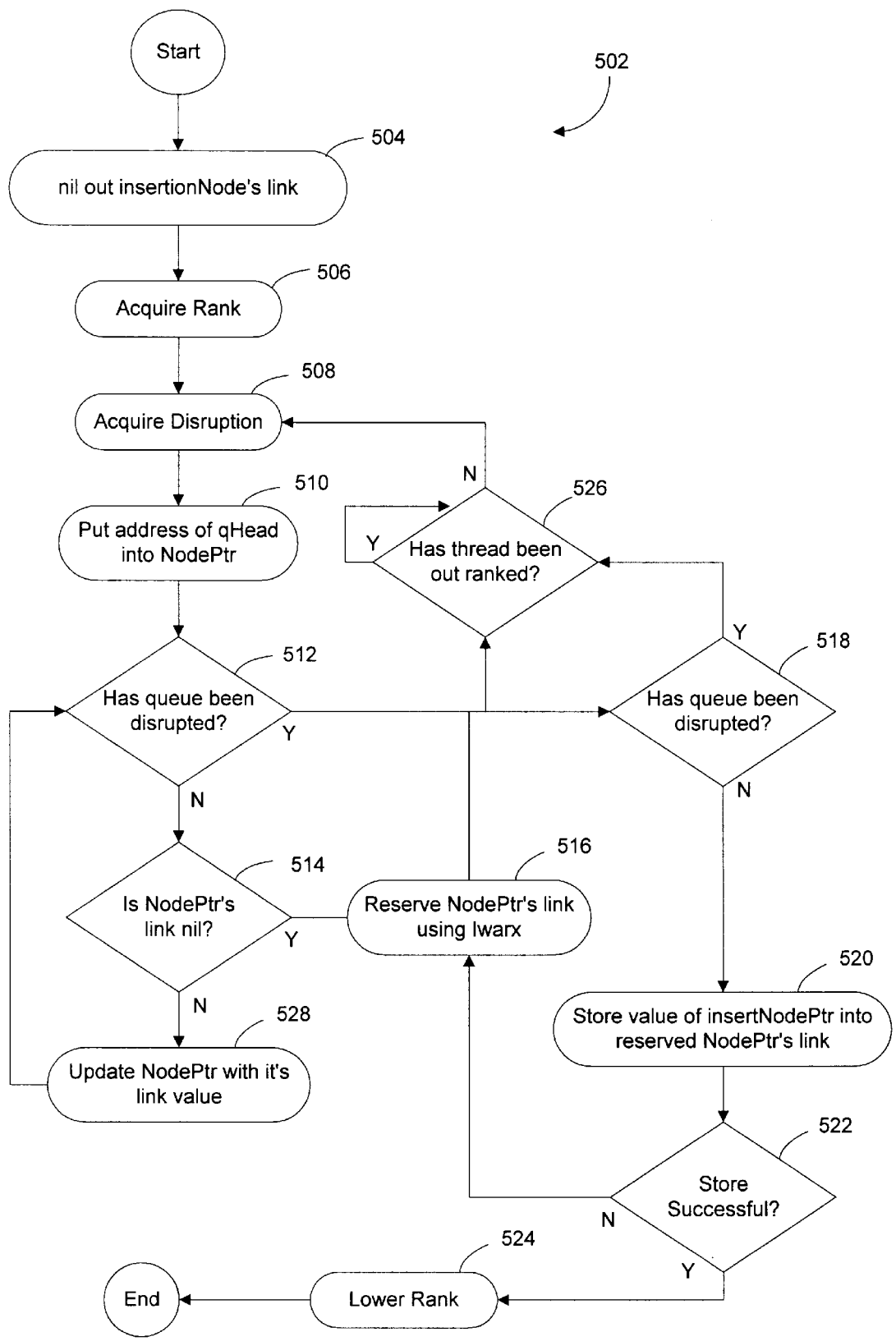
FIG. 5 is a process flow diagram which illustrates the steps associated with enqueuing an element on the tail of a queue in accordance with an embodiment of the present invention.

Instead of enqueuing a node at the head of a queue or in the middle of a queue, a node may also be enqueued at the tail, or end, or a queue. With reference to FIG. 5, a process of enqueuing a node on the tail of a queue will be described in accordance with an embodiment of the present invention. A process 502 of inserting a new node at the tail of a queue begins at step 504 in which the link field of the new node, or the insertion node, is set to nil. In other words, the link field of the new node is set to indicate that the new node is the last node in the queue. It should be appreciated that instead of setting the link field to nil, substantially any suitable setting may generally be used to indicate that the new node is the last node in a queue.

After the link field of the new node is set to nil, the enqueuing thread acquires the rank of the queue in step 506, as well as the disruption level of the queue in step 508. The steps associated with acquiring the rank and the disruption level will be described below with reference to FIGS. 9 and 11, respectively. Once acquired, the rank and the disruption level are on a stack that is local to the enqueuing thread. From step 508, process flow moves to step 510 where the address of head of the queue is placed into the link field of the node pointer or, more specifically, the current node pointer. In the described embodiment, the node pointer is potentially the node which directly precedes the new node which is to be inserted.

As it is possible that another thread may have accessed the queue while the address of the head of the queue was placed into the node pointer, a determination is made in step 512 regarding whether the queue has been disrupted. If it is determined that the queue has not been disrupted, as for example by comparing the stored disruption level to the current disruption level, then the indication is that the address of the head of the queue is valid. Hence, a determination is made in step 514 as to whether the link of the node pointer is nil.

If it is determined that the link field of the current node pointer is nil, then process flow moves from step 514 to step 516 in which the link field of the current node pointer is reserved. In one embodiment, the link field is reserved using an lwarx operation, which was described above with reference to FIG. 3. After the link field is reserved, a determination is made in step 518 regarding whether the queue has been disrupted, e.g., while the link field of the current node pointer was being reserved. If the determination is that the queue has not been disrupted, an attempt is made to store the value of the insert node pointer, or the node pointer to the new node, into the reserved link field of the current node pointer in step 520. The node pointer, or the current node pointer, is the current end of the queue to which the insert node pointer is to be enqueued.

Once an attempt is made to store the value of the insert node pointer, then in step 522, it is determined whether the storage attempt was successful. If the storage attempt was successful, then the rank of the queue is lowered in step 524, and the process of inserting a new node at the tail of the queue is completed. Alternatively, if it is determined that the storage attempt was not successful, then process flow returns to step 516 where the link field of the current node pointer is effectively re-reserved.

Returning to step 518, if the determination is that that queue was disrupted, then a determination is made as to whether the enqueuing thread has been outranked in step 526. In other words, a determination is made regarding whether another thread, which has a higher rank than the enqueuing thread, is attempting to perform operations on the queue. If it is determined that the enqueuing thread has been outranked, then the enqueuing thread is not allowed perform any operations on the queue until the enqueuing thread is no longer outranked. When it is determined in step 526 that the enqueuing thread is not outranked, then the current disruption level of the queue is acquired in step 508 and stored in a stack.

Returning next to step 514, when it is determined that the link of the node pointer is not nil, or otherwise indicates that the node pointer is not the last node in the queue, then the node pointer is updated in step 528. Specifically, in the described embodiment, the node is updated to point to the subsequent node in the queue. Then, process flow returns to step 512 in which a determination is made regarding whether the queue has been disrupted.

In addition to inserting nodes in a queue, nodes may also be removed from a queue. A node may be removed from a queue, for example, when the data contained in the node is outdated or no longer valid. Substantially any node, with the exception of the head node, may be removed from a queue. By way of example, the first data-containing node may be removed from a queue. Alternatively, a node may be removed from somewhere in the middle of a queue, as well as from the tail of a queue.

Figure 6:
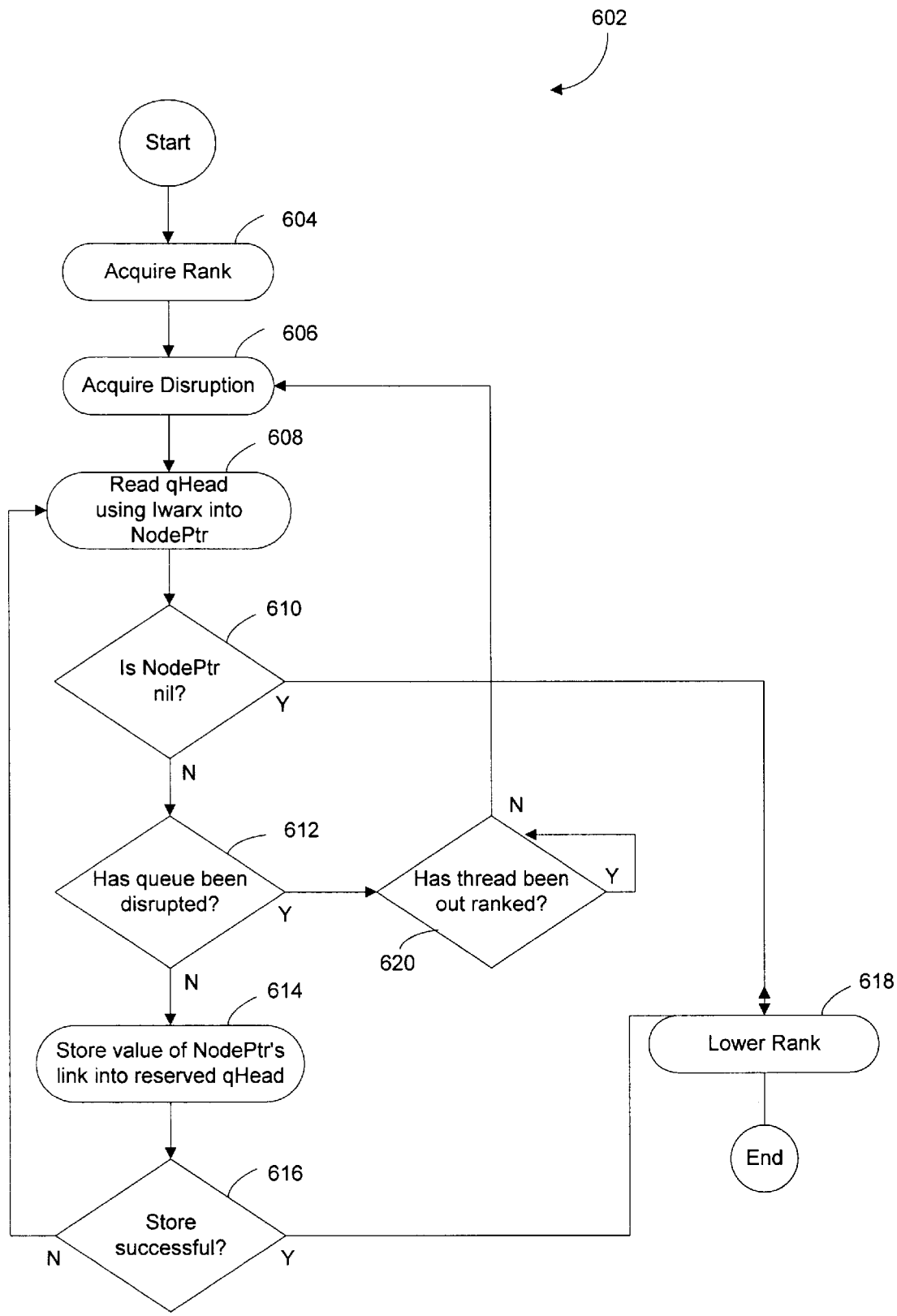
FIG. 6 is a process flow diagram which illustrates the steps associated with dequeuing an element from the head of a queue in accordance with an embodiment of the present invention.

With reference to FIG. 6, the steps associated with removing, or dequeuing, a node from the head of a queue will be described in accordance with an embodiment of the present invention. That is, the steps associated with dequeuing the data-containing node that immediately follows the head of the queue will be described. A process 602 of dequeuing a node from the head of a queue begins at step 604 where the rank of the queue is acquired by the dequeuing, or current, thread and stored in a stack associated with the thread. One process of acquiring the rank of a queue will be described below with reference to FIG. 9. After the rank of the queue is acquired, the disruption level of the queue is acquired in step 606. While the steps associated with acquiring the disruption level of the queue may vary widely, one particularly suitable process for acquiring the disruption level will be described below with respect to FIG. 11.

The head value in the queue head is read into a node pointer in step 608. While any suitable method may be used to read the head value of the queue into the node pointer, in the described embodiment, an lwarx instruction is used to read the head value of the queue into the node pointer. Once the head value of the queue head is read into the node pointer, the head is effectively reserved.

From step 608, process flow moves to step 610 in which a determination is made regarding whether the node pointer is nil, i.e., whether the value stored in the node pointer is nil. If it is determined that the value in the node pointer is not nil, then the indication is that the queue from which a node is to be removed includes at least one data-containing node. As such, in step 612, it is determined whether the queue has been disrupted, e.g., since the disruption level was acquired in step 606.

When it is determined in step 612 that the queue has not been disrupted, then in step 614, an attempt is made to store the value in the link field of the node pointer into the reserved head of the queue. In other words, an attempt is made to store the node pointer to by the link field, which was previously stored in the new node, into the head of the queue such that the head of the queue identifies this node as the new first data-containing node in the queue. Once the attempt is made to store the value of the node pointer, a determination is made in step 616 regarding whether the attempted storage operation was successful. If it is determined that the value of the node pointer was successfully stored into the reserved head of the queue, then the indication is that the node was successfully removed from the head of the queue. Accordingly, the rank of the queue is lowered by the dequeuing thread in step 618, and the process of dequeuing a node from the head of the queue is completed.

Alternatively, if the determination in step 616 is that the attempted storage operation was not successful, then the implication is that the node was not successfully removed from the head of the queue. Hence, in the described embodiment, another attempt may be made to remove the node. As such, process flow returns to step 608 in which the head value of the head of the queue is read into the node pointer.

If the determination in step 612 had been that the queue had been disrupted, then a determination is made in step 620 regarding whether the dequeuing thread has been outranked. In other words, it is determined if the dequeuing thread has the highest rank of all thread which are currently attempting to perform operations with respect to the queue. Until it is determined that the dequeuing thread has the highest rank, the dequeuing thread is not allowed to perform any operations on the queue. By way of example, the dequeuing thread may not dequeue a node from the head of the queue. When it is determined that the dequeuing thread is not outranked and, as a result, has the highest rank, then process flow proceeds to step 606 in which the disruption level is acquired from the head of the queue and stored in a stack associated with the dequeuing thread.

Returning to the determination of whether the node pointer is nil in step 610, if the determination is that the node pointer is nil, then the queue effectively has no data-containing nodes. That is, the queue is effectively empty. Therefore, since the queue contains no nodes, a node may not be removed from the queue. When the queue is empty, process flow moves from step 610 to step 618 where the dequeuing thread lowers the rank of the queue, as will be described below with reference to FIG. 10. Once the rank is lowered, the attempt at dequeuing a node from the head of the queue is terminated.

Figure 7:
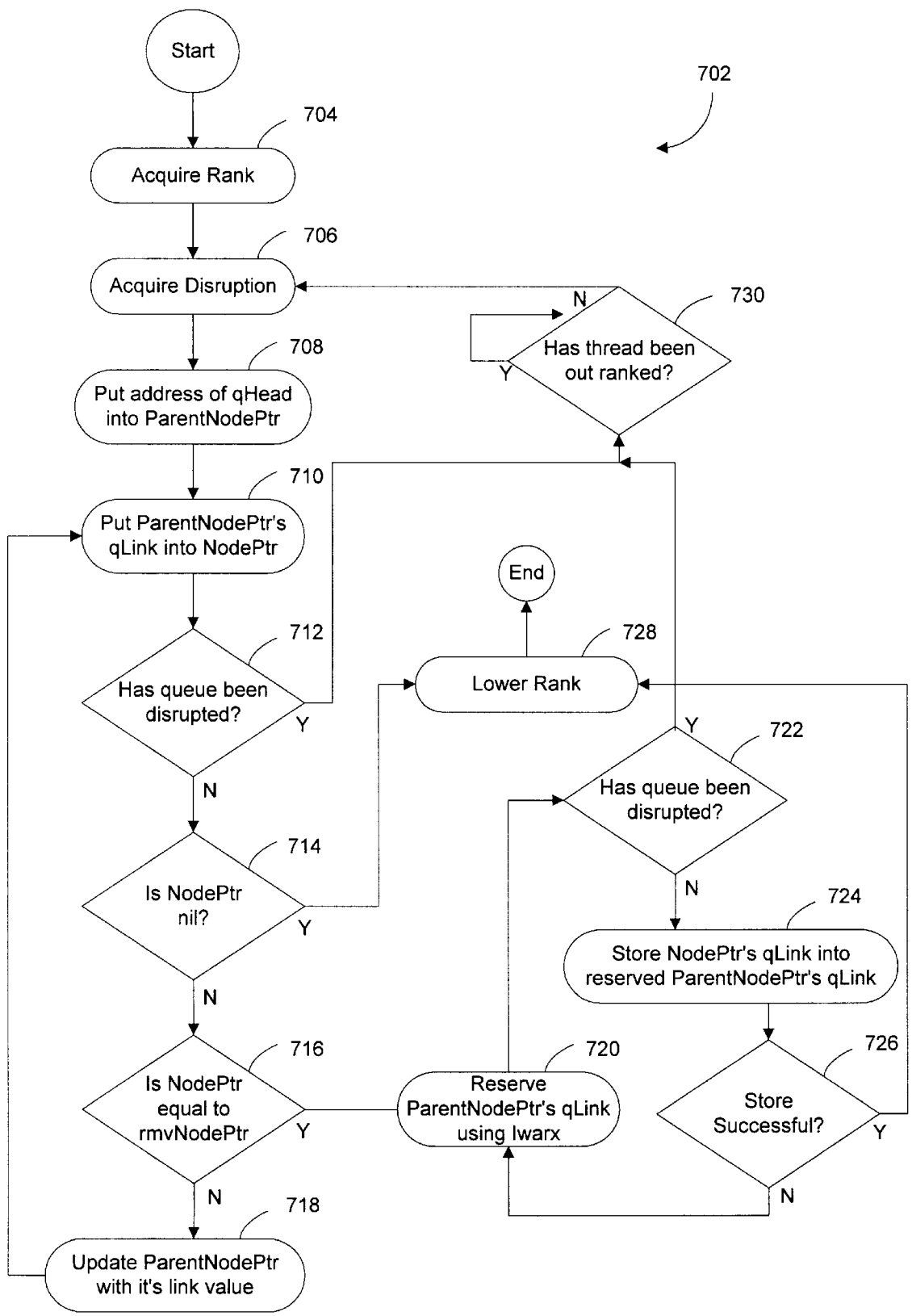
FIG. 7 is a process flow diagram which illustrates the steps associated with dequeuing an element from the middle of a queue in accordance with an embodiment of the present invention.

FIG. 7 is a process flow diagram which illustrates the steps associated with dequeuing a node from the middle of a queue in accordance with an embodiment of the present invention. A process 702 begins at step 704 in which the rank of the queue is acquired by the dequeuing thread and stored in a stack associated with the thread, as will be described below with reference to FIG. 9. After the rank of the queue is acquired, the disruption level of the queue is acquired in step 706. One process for acquiring the disruption level will be described below with respect to FIG. 11.

From step 706, process flow moves to step 708 in which the address of the head of the queue is placed into a parent node pointer. After the address of the head of the queue is placed into the parent node pointer, then in step 710, the contents of the link field of the parent node pointer are stored into the node pointer.

A determination is then made in step 712 regarding whether the queue has been disrupted since the disruption level was last acquired and stored, e.g., in step 706. If it is determined that the queue has not been disrupted, then process flow proceeds to step 714 and a determination of whether the node pointer is nil. If it is determined that the node pointer is not nil, a determination is made in step 716 regarding whether the node pointer is equal to the node pointer that is to be removed, e.g., the "rmvNodePtr."

When the link of the node pointer is not equal to the node pointer that is to be removed, then in step 718, the parent node pointer is updated with its link value. Once the parent node pointer is updated, process flow returns to step 710 where the link field of the parent node pointer is placed into the node pointer.

Alternatively, if the determination in step 716 is that the node pointer is equal to the node pointer that is to be removed, then in step 720, the link field of the parent node pointer is reserved, as for example using an lwarx instruction. In other words, the address of the link field of the parent node pointer is reserved. Once the link field of the parent node pointer is reserved, process flow proceeds to step 722 where the disruption level of the queue is checked to determine whether the queue has been disrupted since the previous time the disruption level was checked. If it is determined that the queue has not been disrupted, then the indication is that the dequeuing thread is the only thread which is attempting to manipulate the queue. Accordingly, an attempt is made to store the link field of the node pointer to be removed into the reserved link field of the parent node pointer in step 724.

A determination is made in step 726 to ascertain whether the link field of the node pointer to be removed was successfully stored into the reserved link field. If it is determined that the storage operation was successful, then process flow moves to step 728 where the rank of the queue is lowered, as will be described below with reference to FIG. 11. Once the rank of the queue is lowered, then the process of dequeuing an element from the middle of a queue is completed. If, instead, it is determined in step 726 that the storage operation was not successful, then the indication is that the reservation held on the link field of the parent node pointer is no longer valid. As such, process flow returns to step 720 where a new reservation is made on the link field of the parent node pointer.

When the determination in step 722 is that the queue has been disrupted, then in step 730, a determination is made as to whether the dequeuing thread has been outranked. That is, a determination is made regarding whether the queue has been disrupted by a thread that is of a higher rank than the dequeuing thread. Until it is determined that the dequeuing thread is not outranked, process flow loops at step 730, and the rank of the queue is repeatedly checked. When it is determined that the dequeuing thread is not outranked, then in step 706, the disruption level of the queue is acquired.

Returning to step 714, if the determination is that the node pointer is nil, then the indication is that the tail, or end, of the queue has been reached without the successful removal of a node from the middle of the queue. When the node pointer is nil, then in step 728, the rank of the queue is lowered, and the process of removing a node from the middle of a queue is effectively aborted.

Returning next to the determination of whether the queue has been disrupted in step 712, when it is determined that the queue has been disrupted, then it is determined in step 730 whether the dequeuing thread has been outranked. Specifically, when the queue has been disrupted, in the described embodiment, a determination is then made regarding whether the disruption may have been caused by a thread which has a higher rank than the dequeuing thread.

Figure 8:
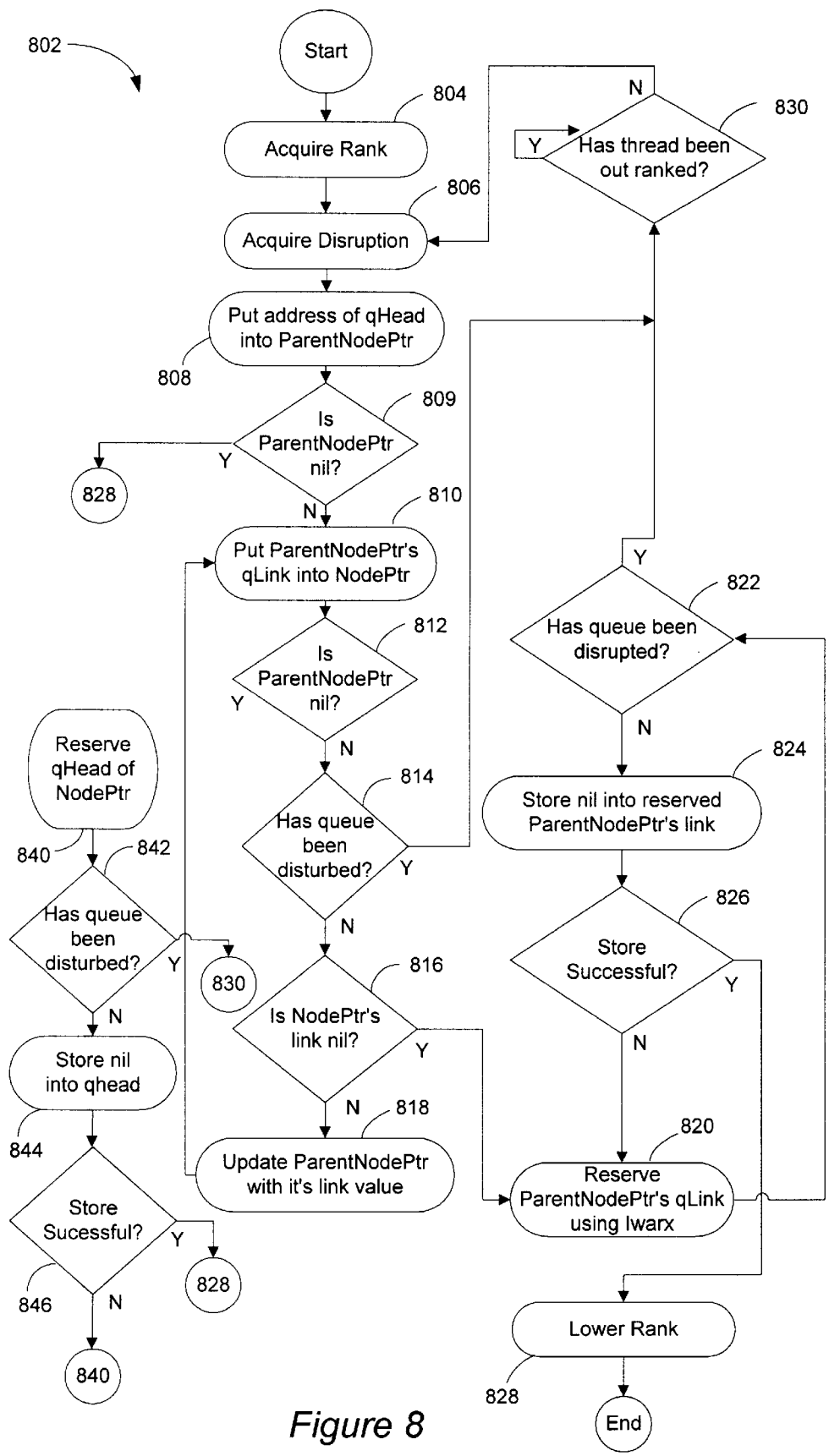
FIG. 8 is a process flow diagram which illustrates the steps associated with dequeuing an element from the tail of a queue in accordance with an embodiment of the present invention.

With reference to FIG. 8, a process of dequeuing a node from the tail, or end, of a queue will be described in accordance with an embodiment of the present invention. A process 802 begins at step 804 where the rank of the queue is acquired by the dequeuing thread and stored in a stack associated with the thread, as will be described below with reference to FIG. 9. After the rank of the queue is acquired, the disruption level of the queue is acquired and stored in step 806. The steps associated with acquiring the disruption level will be described below with respect to FIG. 11.

After the rank and the disruption level are obtained, the address of the head of the queue is placed into a parent node pointer in step 808. Once the address of the head of the queue is placed into the parent node pointer, it is determined in step 809 whether the parent node pointer is nil. If it is determined that the parent node pointer is nil, then process flow moves to step 828 in which the rank of the queue is lowered, and the process of removing a node from the tail of a queue is terminated. Alternatively, if it is determined that the parent node pointer is not nil, the contents of the link field of the parent node pointer are stored into the node pointer in step 810.

From step 810, process flow moves to step 812 in which a determination is regarding whether the node pointer is nil. If it is determined that the node pointer is not nil, then process flow proceeds to step 814 and a determination of whether the queue has been disrupted in the time that has elapsed since the disruption level was last acquired. If it is determined that the queue has not been disrupted, a determination is made in step 816 regarding whether the link associated with the node pointer is nil.

When the link of the node pointer is not nil, then in step 818, the parent node pointer is updated with its link value. Once the parent node pointer is updated, process flow returns to step 810 where the link field of the parent node pointer is placed into the node pointer.

Alternatively, if the determination in step 816 is that the link of the node pointer is nil, then in step 820, the link field of the parent node pointer is reserved, as for example using an lwarx instruction, as described above with respect to FIG. 3. After the link field of the parent node pointer is reserved, process flow proceeds to step 822 where the disruption level of the queue is checked to determine whether the queue has been disrupted since the previous time the disruption level was checked. If it is determined that the queue has not been disrupted, then the indication is that the dequeuing thread is the only thread which is attempting to manipulate the queue. Accordingly, an attempt is made to store a value of nil into reserved link field of the parent node pointer in step 824. By setting storing a value of nil into the reserved link field, the current parent node pointer is set as the new tail of the queue.

A determination is made in step 826 to ascertain whether the value of nil was successfully stored into the reserved link field. If it is determined that the storage operation was successful, then process flow moves to step 828 where the rank of the queue is lowered, as will be described below with reference to FIG. 11. Once the rank of the queue is lowered, then the process of dequeuing an element from the tail of a queue is completed. Alternatively, if it is determined in step 826 that the storage operation was not successful, then the indication is that the reservation held on the link field of the parent node pointer is no longer valid. When the reservation is considered to be invalid, process flow returns from step 826 to step 820 where a new reservation is made on the link field of the parent node pointer.

If the determination in step 822 is that the queue has been disrupted, then in step 830, a determination is made as to whether the dequeuing thread has been outranked. That is, a determination is made regarding whether the queue has been disrupted by a thread that is of a higher rank than the dequeuing thread. Until it is determined that the dequeuing thread is not outranked, process flow loops at step 830, and the rank of the queue is repeatedly checked. When it is determined that the dequeuing thread is not outranked, then in step 806, the disruption level of the queue is acquired.

Returning now to the determination of whether the queue has been disrupted in step 814, when it is determined that the queue has been disrupted, then a determination is made in step 830 regarding whether the dequeuing thread has been outranked Specifically, when the queue has been disrupted, in the described embodiment, a determination is then made regarding whether the disruption may have been caused by a thread which has a higher rank than the dequeuing thread.

Returning next to step 812, if the determination is that the node pointer is nil, then the indication is the queue contains no elements to be removed. When the node pointer is nil, the head of the node pointer is reserved in step 840. After the head of the node pointer is reserved, as for example using an lwarx instruction, a determination is made in step 842 as to whether the queue has been disrupted.

When it is determined that the queue has been disrupted, then process flow proceeds to step 830 where it is determined if the thread has been outranked. If the determination in step 842 is that the queue has not been disrupted, then an attempt is made to store a value of nil into the reserved queue head link in step 844. A determination is made in step 844 regarding whether the storage operation was successful. If the determination is that the storage attempt was successful, then the rank of the queue is lowered in step 828, and the process of dequeueng a node from the end of the queue is completed. Alternatively, if it is determined that the storage attempt was not successful, then process flow returns to step 840 where the head of the node pointer is reserved.

As mentioned above, when nodes are to be enqueued to or dequeued from a queue, the rank of the queue is acquired and stored, as for example in a stack. In general, the steps associated with acquiring the rank of a queue may be widely varied. One example of a method for atomically acquiring the rank of a queue in accordance with an embodiment of the present invention is given in FIG. 9. A process 902 of atomically acquiring a rank begins at step 904 in which the rank of the queue, e.g., "qrank," is read into a local rank variable. In one embodiment, the local rank variable is a variable that is associated with the thread which is obtaining the rank of the queue. As such, the incremented local rank variable is effectively stored, as for example on a stack, with respect to the thread. While a variety of different methods may be used to read in the rank of the queue, one suitable method involves using the lwarx instruction, which was previously described.

After the rank of the queue is stored into the local rank variable, the local rank variable is incremented in step 906, e.g., the local rank variable is incremented by one. Then, in step 908, an attempt is made to store the local rank variable as the rank of the queue using any suitable operation, as for example a store conditional (stwcx) instruction. A stwcx instruction is arranged to write only to an address, e.g., the head value of the head of a queue, when the thread has a reservation on the address.

In step 910, a determination is made regarding whether the attempt to store the local rank variable into the head of the queue was successful. If it is determined that the local rank variable was successfully stored into the head of the queue, then the process of atomically acquiring the rank of the queue is considered to be completed. Alternatively, if it is determined that the local rank variable was not successfully stored into the head of the queue, then process flow returns to step 904 in which the rank of the queue is read from the head of the queue into the local rank variable. Although the storage operation may be unsuccessful for any number of reasons, the storage operation may be unsuccessful when another thread accesses the rank of the queue during the attempted storage operation. As such, when the storage operation is unsuccessful, the steps associated with acquiring the rank are effectively repeated from the beginning.

Figure 10:
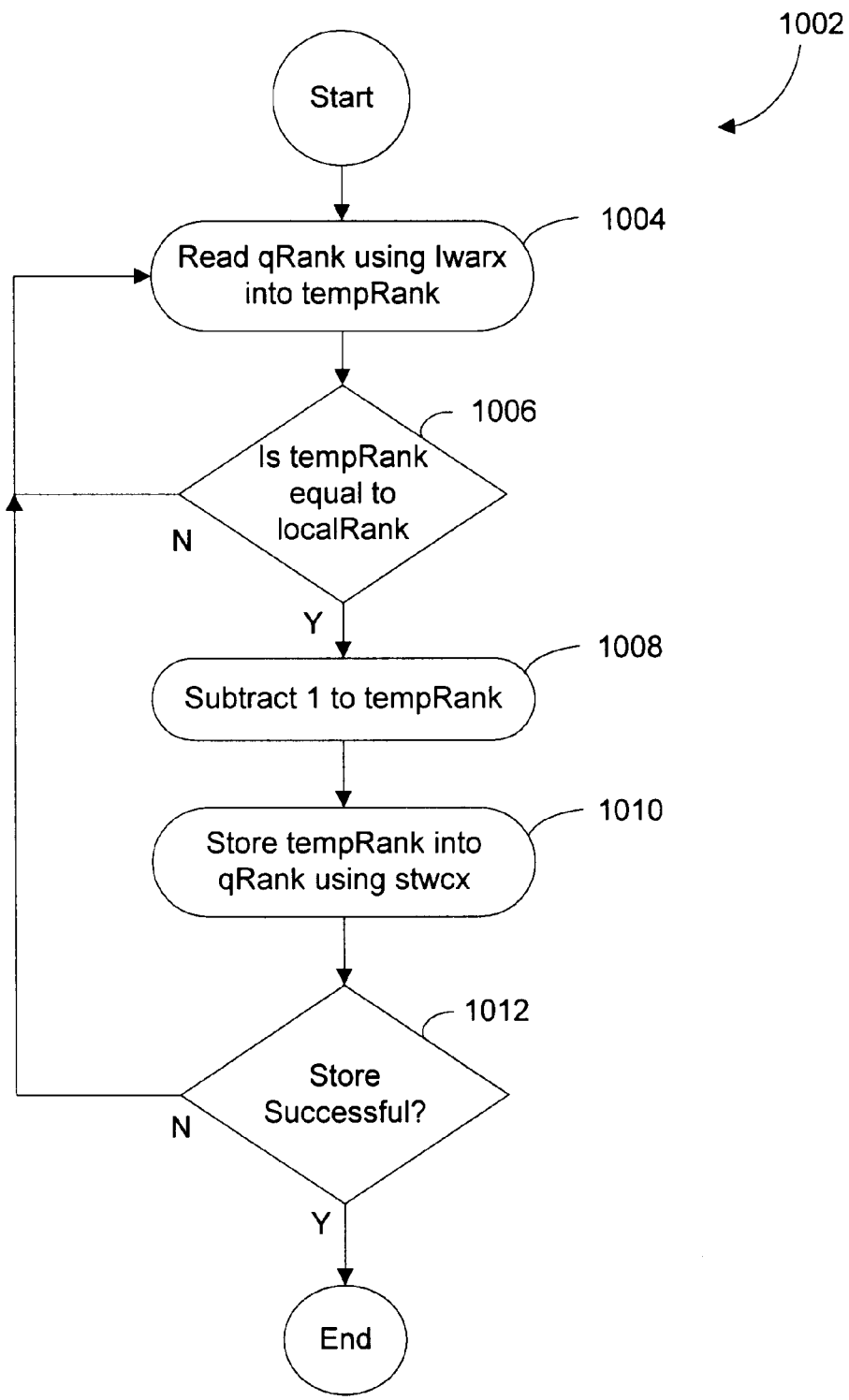
FIG. 10 is a process flow diagram which illustrates the steps associated with atomically lowering a rank acquired from a queue in accordance with an embodiment of the present invention.

Since a thread raises the rank of a queue in the process of acquiring the rank of the queue, when the thread completes operations on the queue, the thread generally lowers the rank of the queue. Typically, lowering the rank of the queue returns the rank of the queue to the rank level that was in existence when the rank was acquired by the thread. FIG. 10 is a process flow diagram which illustrates the steps associated with atomically lowering a rank acquired from a queue in accordance with an embodiment of the present invention. A process 1002 of atomically lowering a rank begins at step 1004 in which the rank of the queue, e.g., "qrank," is read into a temporary rank variable. Although a variety of different methods may be used to read the rank of the queue into the temporary rank variable, one suitable method involves using the lwarx instruction.

After the rank of the queue is stored into the temporary rank variable, a determination is made in step 1006 as to whether the temporary rank variable is equal to the local rank variable, i.e., the local rank variable described above with respect to FIG. 9. If it is determined that the temporary rank variable and the local rank variable are not equal, then the indication is that more than one thread is currently accessing the queue. Accordingly, process flow returns to step 1004 in which the rank is re-read from the head of the queue.

Alternatively, if the determination in step 1006 is that the temporary rank variable is equal to the local rank variable, then the implication is that the current thread is the only thread which is performing any operation on the queue. Hence, in step 1008, the temporary rank variable is decremented, e.g., decremented by one. Then, in step 1010, an attempt is made to store the decremented temporary rank variable as the rank of the queue using an instruction such as a stwcx instruction.

A determination is made in step 1012 as to whether the attempt to store the temporary rank variable into the head of the queue was successful. If it is determined that the temporary rank variable was successfully stored into the head of the queue, then the process of atomically lowering the rank of the queue is completed. If, however, it is determined that the local rank variable was not successfully stored into the head of the queue, then process flow returns to step 1004 in which the rank of the queue is read from the head of the queue into the temporary rank variable.

Figure 11:
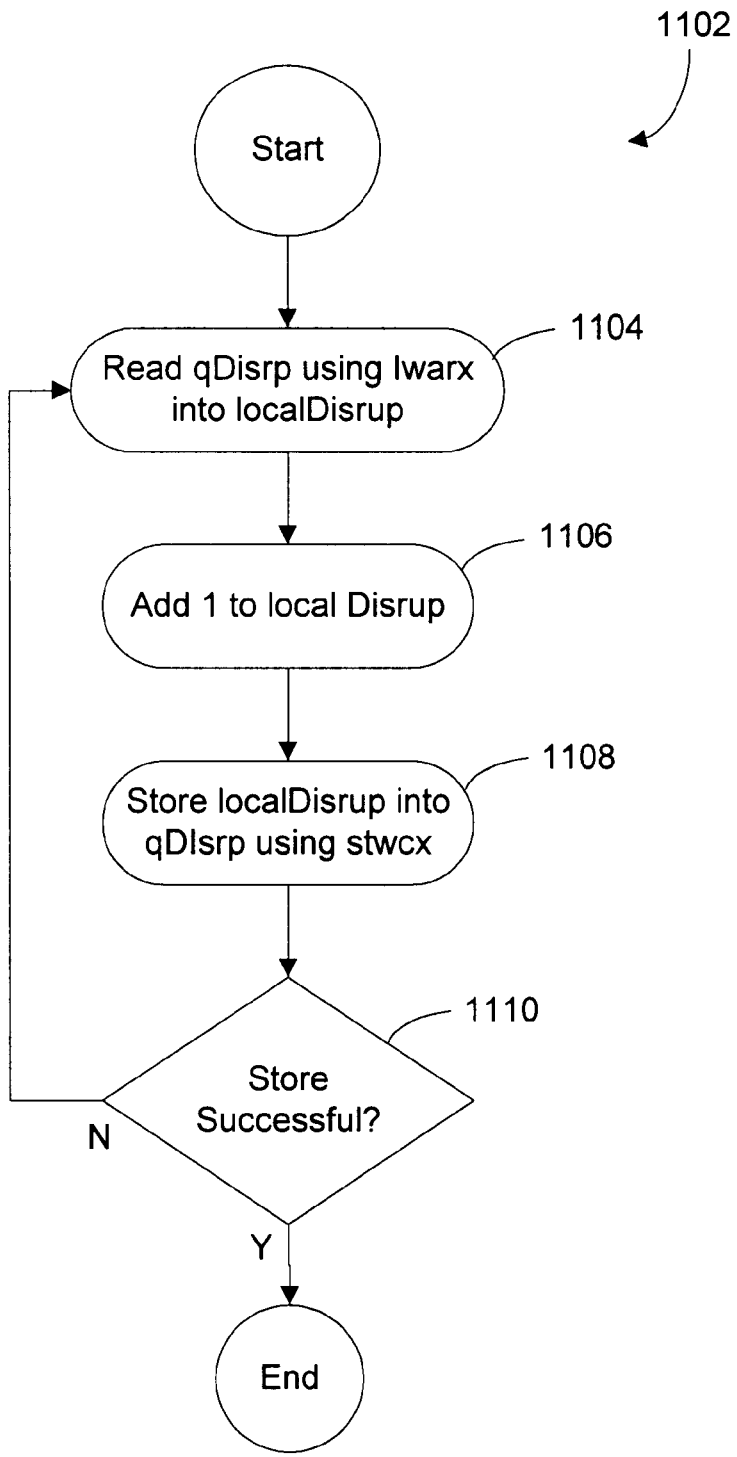
FIG. 11 is a process flow diagram which illustrates the steps associated with atomically acquiring a disruption from a queue in accordance with an embodiment of the present invention; and, FIG. 12 illustrates a typical, general-purpose computer system suitable for implementing the present invention.

With reference to FIG. 11, one process of atomically acquiring a disruption from a queue in accordance with an embodiment of the present invention. A process 1102 for acquiring a disruption begins at step 1104 in which the disruption level, e.g., "qDisrp," of the queue is obtained and stored into a local disruption variable associated with the current thread. That is, the current thread obtains the disruption level of the queue from the head of the queue, and stores the disruption level into a local disruption variable on an associated stack. In one embodiment, the disruption level is read using an lwarx instruction.

In step 1106, the local disruption variable is incremented, as for example by one. Once the local disruption variable is incremented, an attempt is made in step 1108 to store the local disruption variable into the head of the queue, in place of the disruption level. While substantially any suitable operation may be used in trying to store the local disruption variable into the head of the queue, in one embodiment, a stwcx operation may be used. A determination is made regarding whether the storage attempt was successful in step 1110. If it is determined that the storage attempt was successful, then the indication is that the local disruption variable was successfully stored as the disruption level in the head of the queue. Accordingly, the steps associated with atomically acquiring a disruption level are completed.

Alternatively, if the determination in step 1110 is that the storage attempt was not successful, then a thread other than the current thread may be attempting to access the queue substantially at the same time as the current thread. Hence, the current thread may be prevented from storing the local disruption variable into the head of the queue. As such, when the storage attempt is unsuccessful, then process flow returns to step 1104, where the local disruption level is re-read into the local disruption variable from the head of the queue.

Figure 12:
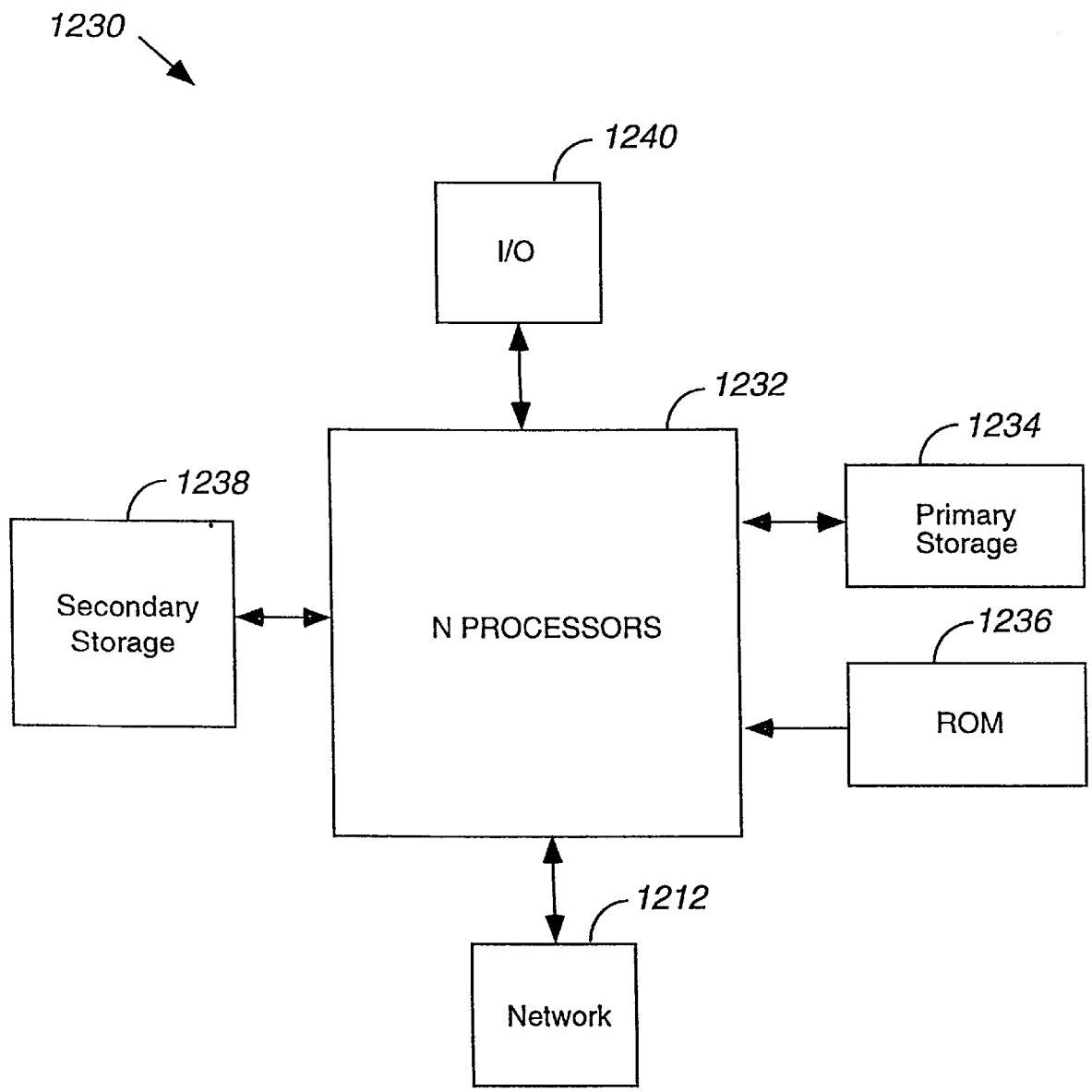

In general, the present invention may be implemented on any suitable computer system. FIG. 12 illustrates a typical, general-purpose computer system suitable for implementing the present invention. A computer system 1230 includes any number of processors 1232, which are also referred to as central processing units, or CPUs. In other words, computer system 1230 may be a multiprocessor system. CPUs 1232 are typically coupled to memory devices which include, but are not limited to, a first primary storage device 1234 that is often a read only memory, or ROM, and a second primary storage device 1236 that is often a random access memory, or RAM.

ROM acts to transfer data and instructions uni-directionally to CPUs 1232, while RAM is used typically to transfer data and instructions in a bi-directional manner, as will be appreciated by those skilled in the art. Both primary storage devices 1234 and 1236 may include any suitable computer-readable media. A secondary storage medium 1238, which is typically a mass memory device, is also coupled bi-directionally to CPUs 1232 and provides additional data storage capacity. Mass memory device 1238 is a computer-readable medium that may be used to store programs including computer code, data, and the like. Typically, mass memory device 1238 is a storage medium such as a hard disk, a tape, or a CD-ROM, which is generally slower than primary storage devices 1234 and 1236. Mass memory storage device 1238 may include a secure database. It will be appreciated that the information retained within mass memory device 1238, may, in appropriate cases, be incorporated in standard fashion as part of RAM 1236 as virtual memory.

CPUs 1232 are also coupled to one or more input/output devices 1240 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1232 optionally may be coupled to a computer or telecommunications network, e.g., an internet network or an intranet network, using a network connection as shown generally at 1212. With such a network connection, it is contemplated that the CPUs 1232 might receive information from a server machine, or might output information to the server machine in the course of performing the above-described method steps. Such information, which is often represented as a sequence of instructions to be executed using CPUs 1232, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the invention. By way of example, although atomic queues have been described as having both a rank and a disruption level, an atomic queue may instead include either only a rank or only a disruption level. When a system is not a multiprocessor system, i.e., when a system includes only a single processor, the use of a rank in a queue may be eliminated. In other words, for a queue which may be manipulated only by a single processor, the queue may not have an associated rank.

The steps associated with enqueuing and dequeuing elements from a queue may generally be widely varied. For instance, steps may generally be reordered, added, and removed. In addition, the steps associated with acquiring a rank, lowering a rank, and acquiring a disruption level may also vary.

While the methods of enqueuing and dequeuing elements from a queue have been described in terms of first obtaining the rank of a queue, then obtaining the disruption level of the queue, it should be appreciated that the order in which the rank and the disruption level are obtained may vary. Further, the steps of acquiring a rank and a disruption may be separated by additional steps without departing from the spirit or the scope of the present invention.

When it is determined that an element may not be added to the middle of a queue, the element may be added to the end of the queue, as described above with respect to FIG. 4. It should be appreciated, however, that in lieu adding an element to the tail of the queue when an attempt to add the element in the middle of the queue fails, the attempt at adding the element anywhere in the queue may be aborted. That is, when an element may not be added in the middle of the queue, the overall operation of adding the element to the queue may be abandoned. In one embodiment, a true-false boolean may be used to signify whether to add an element to the tail of a queue when an attempt to add the element to the middle of the queue fails, or whether to effectively abort the attempt completely when the attempt to add the element to the middle of the queue fails.

As described above, the head of a queue is not generally considered to be a data-containing node, since the head of the queue contains substantially only a head value, a rank, and a disruption level. However, in some cases, the head of the queue may be arranged to include data in addition to the head value, the rank, and the disruption level without departing from the spirit or the scope of the present invention. In other words, the head of the queue may be a data-containing node.

It may be desirable, in some embodiments, to align the bytes associated with the nodes, as will be appreciated by those skilled in the art. By way of example, lwarx and stwcx instructions may be implemented more efficiently if the nodes or, more specifically, the bytes associated with the nodes are aligned, e.g., four byte aligned.

Although a value of nil, or null, placed in the link field of a node has been described as identifying the node as the tail of a queue, it should be appreciated that substantially any value may be used to identify the tail of the queue. By way of example, a particular character string or integer value may be placed in the link field of a node to signify that the node is at the tail of the queue. Therefore, the present examples are to be considered as illustrative and not restrictive, and the invention is not to be limited to the details given herein, but may be modified within the scope of the appended claims.

What is claimed is:

1. A queue structure suitable for use in an overall computer system, the queue structure being arranged for data to be stored sequentially therein, wherein the queue structure facilitates access to the data within the overall computer system, the queue structure further being arranged to be accessed by a plurality of threads, the plurality of threads being associated with the overall computer system, the queue structure comprising:

a head node, the head node including a head field and a disruption field, the disruption field being arranged to indicate a number of times the queue structure is accessed; and a first data-containing node, the first data-containing node being identified by the head field in the head node, wherein the first data-containing node includes a link field and a data field.

2. A queue structure as recited in claim 1 wherein the head node further includes a rank field, the rank field being arranged to identify a preference level associated with the plurality of threads.

3. A queue structure as recited in claim 2 wherein the head field is the first field in the head node, the rank field is the second field in the head node, and the disruption field is the third field in the head node.

4. A queue structure suitable for use in an overall computer system, the queue structure being arranged for data to be stored sequentially therein, wherein the queue structure facilitates access to the data within the overall computer system, the queue structure further being arranged to be accessed by a plurality of threads, the plurality of threads being associated with the overall computer system, the queue structure comprising:

a head node, the head node including a head field and a disruption field, the disruption field being arranged to indicate a number of times the queue structure is accessed;

a first data-containing node, the first data-containing node being identified by the head field in the head node, wherein the first data-containing node includes a link field and a data field; and a second data-containing node, the second data-containing node including a link field and a data field.

5. A queue structure as recited in claim 4 wherein the link field of the first data-containing node is arranged to identify the second data-containing node.

6. A queue structure as recited in claim 5 wherein the link field of the second data-containing node is set to indicate that the second data-containing node is a final node in the queue structure.

7. A method for implementing a queue in a computer system, the method comprising:

providing a first data-containing node, the first data-containing node including a link field and a data field; and providing a head node, the head node including a head field and a disruption field, the head field being arranged to identify the first data-containing node, the disruption field being arranged to indicate whether the queue has been disrupted.

8. A method for implementing a queue as recited in claim 7 further including providing the head node with a rank field, the rank field being arranged to identify a preference level associated with a plurality of threads which are arranged to manipulate the queue.

9. A method for implementing a queue as recited in claim 7 further including providing a second data-containing node, wherein the second data-containing node includes a link field and a data field.

10. A method for implementing a queue as recited in claim 9 further including arranging the link field of the first data-containing node to identify the second data-containing node.

11. A computer-implemented method for enqueuing an additional node on a queue, the additional node including a link field, the queue including a head and at least one node, the head including a head field and a disruption field, the head field including contents arranged to identify the at least one node, the disruption field arranged to contain a disruption level of the queue, the computer-implemented method comprising:

acquiring the disruption level of the queue;

reading the contents from the head field into the link field of the additional node;

determining whether the queue has been disrupted; and storing an address of the additional node into the head field when it is determined that the queue has not been disrupted.

12. A computer-implemented method as recited in claim 11 wherein the head further includes a rank field arranged to contain a rank of the queue, the method further including:

acquiring the rank of the queue.

13. A computer-implemented method as recited in claim 12 wherein acquiring the rank of the queue includes:

reading the rank of the queue from the rank field of the head;

incrementing the rank of the queue; and storing the rank of the queue in a computer memory that is separate from the queue.

14. A computer-implemented method as recited in claim 13 further including decrementing the rank of the queue after storing the address of the additional node into the head field.

15. A computer-implemented method as recited in claim 11 wherein acquiring the disruption level of the queue includes:

reading the disruption level of the queue from the disruption field into a first variable;

incrementing the first variable; and storing the first variable in a computer memory that is separate from the queue.

16. A computer-implemented method for enqueuing an additional node on a queue, the additional node including a link field, the queue including a head and at least one node, the head including a head field and a disruption field, the head field including contents arranged to identify the at least one node, the disruption field arranged to contain a disruption level of the queue, the computer-implemented method comprising:

acquiring the disruption level of the queue, the disruption level being arranged to indicate whether the queue has been disrupted;

determining whether the queue has been disrupted using the disruption level; and storing an address of the additional node into a link field of the at least one node when it is determined that the queue has not been disrupted.

17. A computer-implemented method as recited in claim 16 wherein acquiring the disruption level of the queue includes:

reading the disruption level of the queue from the disruption field into a first variable;

incrementing the first variable; and storing the first variable in a computer memory that is separate from the queue.

18. A computer-implemented method as recited in claim 16 further including setting the link field of the additional node to indicate that the additional node is a tail of the queue.

19. A computer-implemented method for enqueuing an additional node on a queue, the additional node including a link field, the queue including a head and at least one node, the head including a head field, a disruption field, and a rank field, the head field including contents arranged to identify the at least one node, the disruption field arranged to contain a disruption level of the queue, the rank field arranged to contain a rank of the queue, the computer-implemented method comprising:

acquiring the disruption level of the queue;

determining whether the queue has been disrupted;

storing an address of the additional node into a link field of the at least one node when it is determined that the queue has not been disrupted; and acquiring the rank of the queue.

20. A computer-implemented method as recited in claim 19 wherein acquiring the rank of the queue includes:

reading the rank of the queue from the rank field of the head;

incrementing the rank of the queue; and storing the rank of the queue in a computer memory that is separate from the queue.

21. A computer-implemented method as recited in claim 20 further including decrementing the rank of the queue after storing the address of the additional node into the head field.

22. A computer system arranged to enqueue an additional node on a queue, the additional node including a link field, the queue including a head and at least one node, the head including a head field and a disruption field, the head field including contents arranged to identify the at least one node, the disruption field arranged to contain a disruption level of the queue, the computer system comprising:

a thread arranged to acquire the disruption level of the queue, the disruption level being arranged to indicate whether the queue has been disrupted;

a mechanism for reading the contents from the head field into the link field of the additional node;

a mechanism for determining whether the queue has been disrupted; and a mechanism for storing an address of the additional node into the head field when it is determined that the queue has not been disrupted.

23. A computer system as recited in claim 22 wherein the head further includes a rank field arranged to contain a rank of the queue, the computer system further including:

a mechanism arranged to read the rank of the queue from the rank field of the head, increment the rank of the queue, and store the rank of the queue in a stack that is associated with the thread.

24. A computer system as recited in claim 22 wherein the mechanism for acquiring the disruption level of the queue is arranged to read the disruption level of the queue from the disruption field into a first variable, increment the first variable, and storing the first variable in a stack associated with the queue.

25. A computer system for enqueuing an additional node on a queue, the additional node including a link field, the queue including a head and at least one node, the head including a head field and a disruption field, the head field including contents arranged to identify the at least one node, the disruption field arranged to contain a disruption level of the queue, the computer system comprising:

a thread for acquiring the disruption level of the queue;

a mechanism for determining whether the queue has been disrupted; and a mechanism for storing an address of the additional node into a link field of the at least one node when it is determined that the queue has not been disrupted.

26. A computer system as recited in claim 25 wherein the head further includes a rank field arranged to contain a rank of the queue, the computer system further including:

a mechanism arranged to read the rank of the queue from the rank field of the head, increment the rank of the queue, and store the rank of the queue in a stack that is associated with the thread.

27. A computer system as recited in claim 25 wherein the mechanism for acquiring the disruption level of the queue is arranged to read the disruption level of the queue from the disruption field into a first variable, increment the first variable, and storing the first variable in a stack associated with the queue.

28. A computer program product arranged for enqueuing an additional node on a queue, the additional node including a link field, the queue including a head and at least one node, the head including a head field and a disruption field, the head field including contents arranged to identify the at least one node, the disruption field arranged to contain a disruption level of the queue, the computer program product comprising:

computer code that acquires the disruption level of the queue;

computer code that reads the contents from the head field into the link field of the additional node;

computer code that determines whether the queue has been disrupted;

computer code that stores an address of the additional node into the head field when it is determined that the queue has not been disrupted; and a computer readable medium that stores the computer codes.

29. A computer program product according to claim 28 wherein the head further includes a rank field arranged to contain a rank of the queue, the computer program product further including:

computer code that reads the rank of the queue from the rank field of the head;

computer code that increments the rank of the queue; and computer code that stores the rank of the queue in a computer memory that is separate from the queue.

30. A computer program product according to claim 28 wherein the computer code that acquires the disruption level of the queue includes:

computer code that reads the disruption level of the queue from the disruption field into a first variable;

computer code that increments the first variable; and computer code that stores the first variable in a computer memory that is separate from the queue.

31. A computer-implemented method for dequeuing a first node from a queue, the queue including a head, the head including a head field and a disruption field, the head field including contents arranged to identify the at least one node, the disruption field arranged to contain a disruption level of the queue, the first node including a link field, the computer-implemented method comprising:

acquiring the disruption level of the queue;

determining whether the queue has been disrupted; and storing contents of the link field of the first node into the head field when it is determined that the queue has not been disrupted.

32. A computer-implemented method as recited in claim 31 wherein the head further includes a rank field arranged to contain a rank of the queue, the method further including:

acquiring the rank of the queue.

33. A computer-implemented method as recited in claim 32 wherein acquiring the rank of the queue includes:

reading the rank of the queue from the rank field of the head;

incrementing the rank of the queue; and storing the rank of the queue in a computer memory that is separate from the queue.

34. A computer-implemented method as recited in claim 31 wherein acquiring the disruption level of the queue includes:

reading the disruption level of the queue from the disruption field into a first variable;

incrementing the first variable; and storing the first variable in a computer memory that is separate from the queue.

35. A computer-implemented method for dequeuing a first node from a queue, the queue including a head, the first node, and a second node, wherein the second node immediately precedes the first node, the first node including a link field, the head including a head field and a disruption field, the head field including contents arranged to identify one of the plurality of nodes, the disruption field arranged to contain a disruption level of the queue, the computer-implemented method comprising:

acquiring the disruption level of the queue;

determining whether the queue has been disrupted; and storing contents of the link field of the first node into a link field of the second node when it is determined that the queue has not been disrupted.

36. A computer-implemented method as recited in claim 35 wherein the head further includes a rank field arranged to contain a rank of the queue, the method further including:

acquiring the rank of the queue.

37. A computer-implemented method as recited in claim 36 wherein acquiring the rank of the queue includes:

reading the rank of the queue from the rank field of the head;

incrementing the rank of the queue; and storing the rank of the queue in a computer memory that is separate from the queue.

* * * * *